Figure 3:
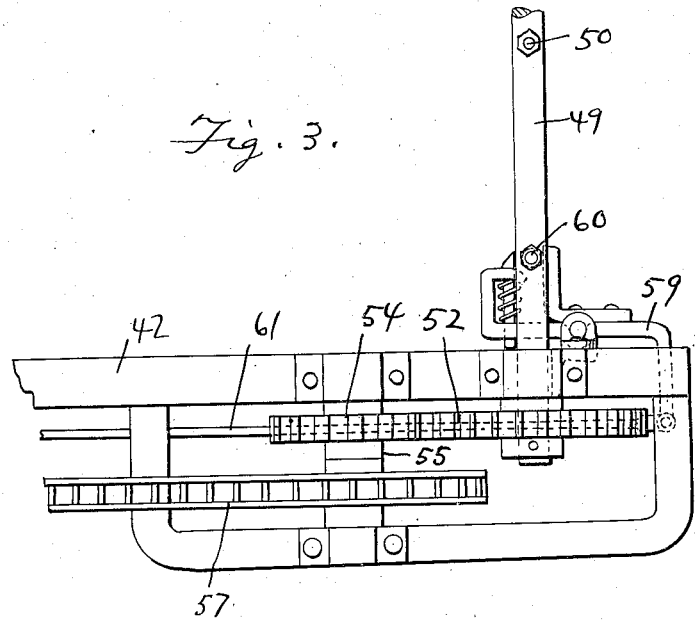

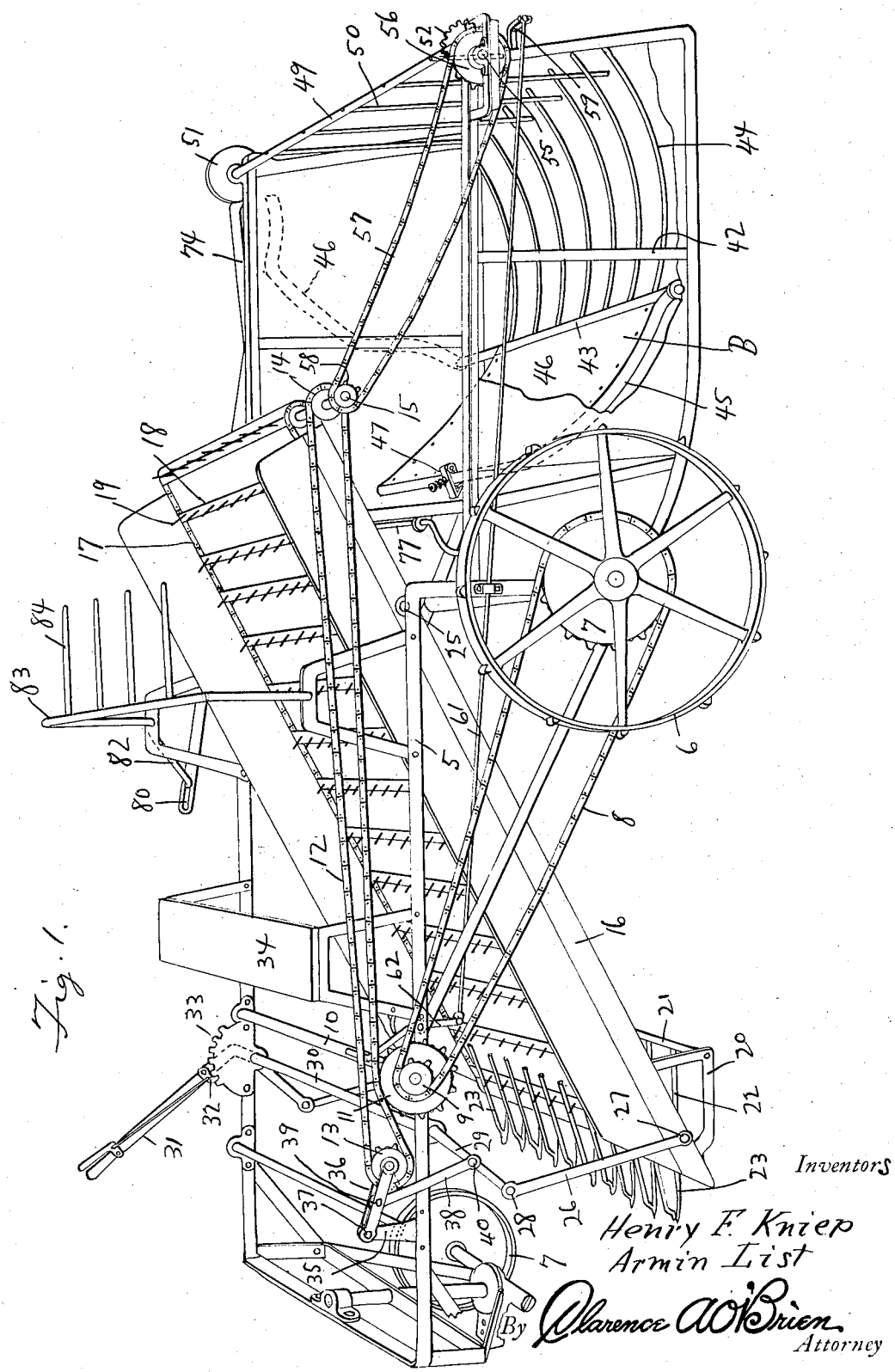

May 20, 1930. H. F. KNIEP ET AL 1,759,263
HARVESTER
Filed Dec. 13, 1927 3 Sheets-Sheet 2
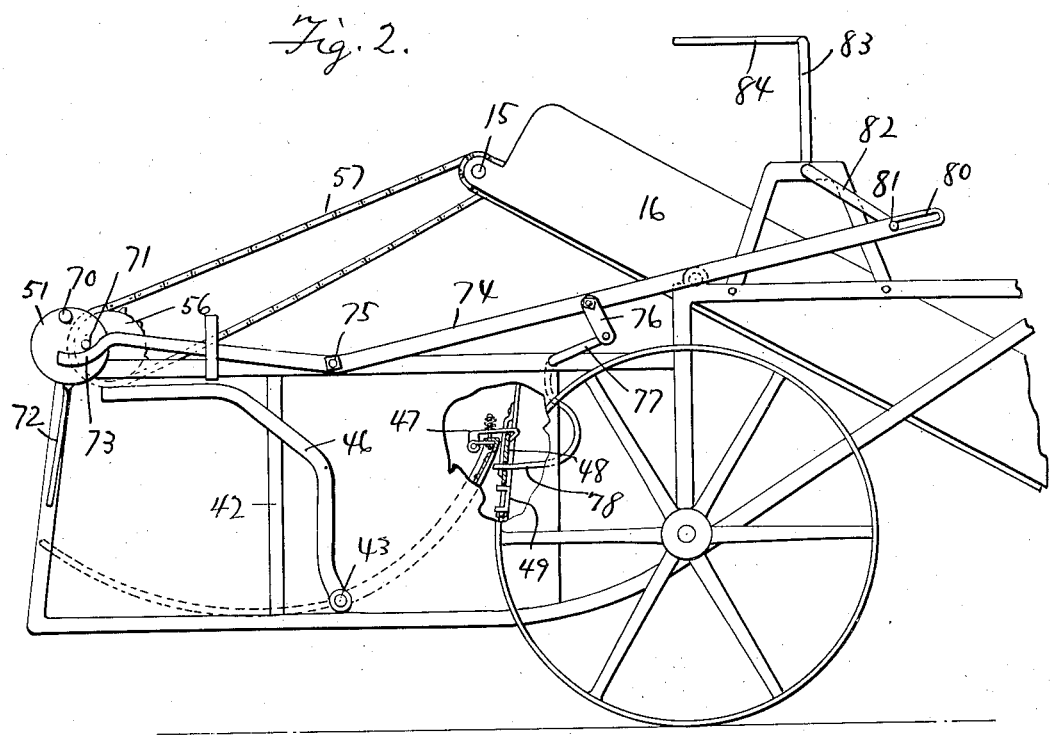
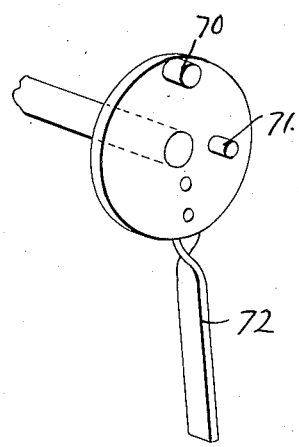
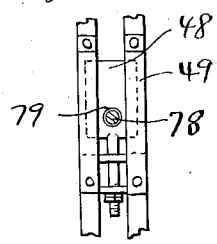
Inventors
Henry F. Kniep
Armin List
By Clarence A. O'Brien
Attorney May 20, 1930. H. F. KNIEP ET AL 1,759,263
HARVESTER
Filed Dec. 13, 1927 3 Sheets-Sheet 3

Inventor
Henry F. Kniep
Armin List
By *Clarence A. O'Brien*
Attorney

Patented May 20, 1930

1,759,263

UNITED STATES PATENT OFFICE

HENRY F. KNIEP AND ARMIN LIST, OF BUHL, IDAHO

HARVESTER

Application filed December 13, 1927. Serial No. 239,670.

The present invention relates to a harvesting machine particularly designed for following a bean cutter to gather up the vines and deposit them in spaced piles as desired along the field.

Another very important object of the invention resides in the provision of a machine of this nature comprising an elevator emptying into a gathering receptacle with means for emptying the receptacle when desired so as to deposit the material on the ground.

A still further important object of the invention resides in the provision of a machine of this nature having means whereby when the receptacle is being emptied the material is stopped in the elevator.

Another very important object of the invention resides in the provision of a machine of this nature having an elevator on a wheeled frame operable thereby and means whereby the elevator may be lifted from engagement with the ground and simultaneously made inoperative.

A still further important object of the invention resides in the provision of a machine of this nature which is comparatively simple in its construction, has its parts arranged in a compact and convenient manner, and is thoroughly efficient and reliable in its operation.

With the above and numerous other objects in view as will appear as the description proceeds, the invention resides in certain novel features of construction, and in the combination and arrangement of parts as will be hereinafter more fully described and claimed.

Figure 4:
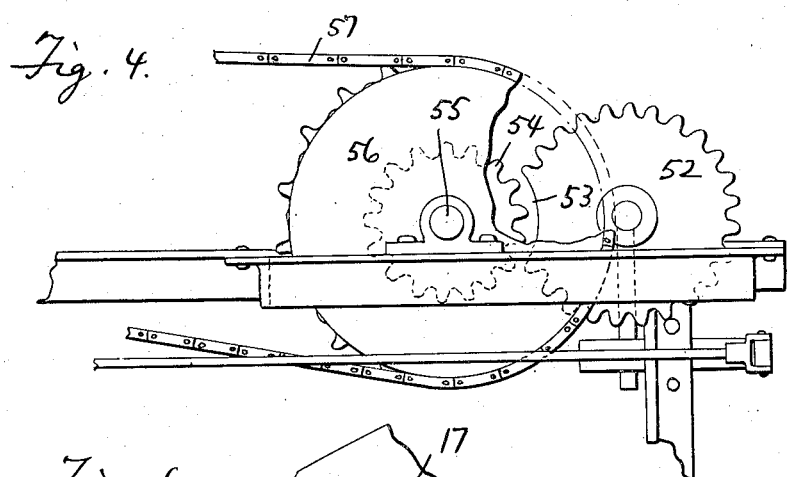
Figure 6:
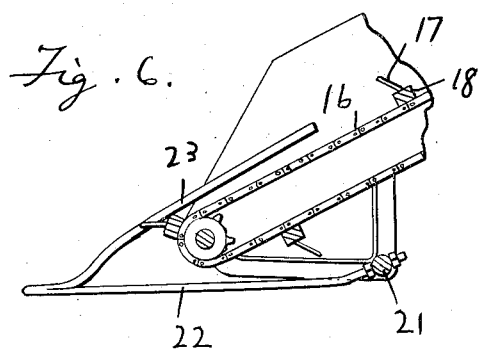

In the drawing:

Figure 1 is a perspective view of the machine embodying the features of our invention, Figure 2 is a fragmentary side elevation of the rear portion thereof showing the side opposite to that illustrated in Figure 1, Figure 3 is an enlarged detail plan view showing the gearing which operates the stripping teeth, Figure 4 is a side elevation thereof, Figure 5 is a fragmentary perspective view showing an actuating disk used in the operation of the machine, Figure 6 is a detail fragmentary vertical longitudinal section through the forward portion of the elevator, and Figure 7 is an enlarged detail view of a latch member.

Referring to the drawing in detail it will be seen that the numeral 5 denotes the main frame which is supported for locomotion on rear wheels 6 and front wheels 7 in any preferred manner. One of the wheels 6 is provided with a sprocket 7 driving a chain 8 which in turn drives a sprocket 9 on a shaft 10 journaled across the frame 5. A sprocket 11 is also mounted on the shaft 10 for driving a chain 12. This chain 12 is trained over sprockets 13 and 14 the latter of which is on a shaft 15 at the upper end of a rearwardly and upwardly inclined elevator 16 which includes endless members 17 operated by the shaft 15. Bars 18 extend between the endless members 17 and have spikes 19 extending outwardly therefrom. Brackets 20 are provided at the lower end of the elevator 16 one to each side thereof and support a cross bar 21 from which forwardly extends tines 22 which are provided at their forward ends with rearwardly and upwardly inclined extensions 23 extending above the lower end of the elevator as is clearly illustrated in Figure 6 so that the spikes 19 move between the extensions 23 and take therefrom the vines which gather thereon as the machine moves forward with the tines running along the ground. This elevator is pivotally mounted intermediate its ends adjacent its upper end in the frame 5 as at 25. Links 26 are connected with the forward lower end of the elevator 16 as at 27 and at their upper ends are connected as at 28 with the extremities of cranks 29 on a shaft 30 rockable across the frame and operable by a lever 31 having a manually controlled detent 32 cooperable with a notched segment 33. Thus by rocking the lever 31 the lower end of the elevator may be lifted or lowered with respect to the ground. This may be conveniently accomplished by a person on the seat 34. A bracket 35 has an arm 36 pivotally engaged therewith as at 37 and the sprocket 13 is journaled in the extremity thereof. A link 38 is pivotally engaged as at 39 with an intermediate portion of the arm 36 and with an intermediate portion of one of the cranks 29 as at 40 so that when the cranks 27 are swung upwardly and forwardly for the purpose of lifting the forward end of the elevator 16 the link 38 is simultaneously pushed up thereby swinging the arm 36 upwardly and raising the sprocket 13 sufficiently so as to clear the lower run of the chain 13 from engagement with the sprocket 9 so that the elevator when elevated from the ground becomes inoperative.

As the description has thus far progressed it will be seen that when the machine moves forwardly the tines 22 will gather the vines from the ground and cause them to move up the extensions 23 to be engaged by the spikes 19 on the upwardly moving bars 18 so that the vines will be moved upwardly by the elevator and deposited rearwardly thereof.

Rearwardly of the elevator and there below is a gathering frame 42 supported by the main frame 5 in any suitable or preferred manner. A bottom structure B is rockably mounted intermediate its ends in the frame 42 and comprises a cross shaft 43 rockable in the bottom of the frame 42 and having curved fingers 44 projecting rearwardly therefrom and a frame 45 with canvas or the like 46 stretched there across projecting forwardly therefrom. An arm 46 rises from one extremity of the shaft 43. The frame 45 has a spring pressed latch 47 mounted thereon engageable with a plate 48 slidable in the guides 49 for the purpose of preventing accidental tilting of the bottom structure B. A shaft 49 is rockably mounted across the rear upper end of the frame 42 and has stripping tines 50 projecting downwardly therefrom between the extremities of the fingers 44. A disk 51 is at one end of the shaft 49 and a segmental gear 52 is mounted at the other end of the shaft 49 and is formed with the blank portion 53 shown to advantage in Figure 4 which is normally opposite to a pinion 54. This pinion 54 is mounted on the shaft 55 on which is also mounted a sprocket 56 over which is trained a chain 57. This chain 57 is also trained over a sprocket 58 on the shaft 15 and as the machine is moving it will be seen that the shaft 55, sprocket 56 and pinion 54 are in rotation but will not rotate the segmental gear 52. A rocker 59 is mounted on the frame and the free end thereof has in its path of movement a finger 60 extending from the shaft 49. A link 61 is connected with the other end of the rocker 59 and extending forwardly and is engaged with a foot pedal 62 rockable on the frame 5 adjacent the seat 34 so that the operator on the seat may depress this foot pedal to move the connecting rod 61 forwardly thereby actuating the rocker 59 and cause the free end thereof to engage the finger 60 and sufficiently rock the shaft 49 to bring the teeth of the gears 52 into mesh with the pinion 54 thereby causing the shaft 49 to make one complete revolution and to move the stripping tines 50 between the fingers 44. As the shaft 49 thus rotates, of course, the disk 51 moves therewith. This disk 51 is provided with off center pins 70 and 71 and also with an arm 72 radiating outwardly therefrom. The pin 70 engages the curved extremity 73 of an elongated rocker 74 pivoted intermediate its ends as at 75 on the upper side portion of the frame 42. A link 76 engages a bell crank 77 rockable in the frame 42 and having an end portion 78 projecting through an opening 79 in the plate 48. When the pin 72 engages the extremity 73 the rocker is actuated so as to lift upwardly on the link 72 and rock the bell crank so that the extremity 78 thereof will move the plate 48 out of engagement with the latch 47. The pin 70, further off center than the pin 71, will next come into engagement with the extremity 73 and further actuate the rocker, the extremity of which is provided with a slot 80 in which is engaged an offset end 81 of a crank 82 on a rockable frame 83 having tines 84 which will be swung downwardly in position to stop the upward progress of vines on the elevator. The arm 72 will swing around and engage the arm 46 to dump the bottom structure B as will be quite apparent and simultaneously the tines 50 will be moving between the fingers 44 so as to insure the freeing of all vines thereon. After the arm 72 has moved out of engagement with the arm 46 the bottom will swing back of its own accord to normal position because the frame portion 47 is heavier than the fingers 44. When it swings back the latch 47 will engage the plate 48 which will have been raised by the weight of the longer end of the rocker 74.

From the above detailed description it will be seen that the vines are gathered in the receptacle formed by the frame 42 and the bottom structure B from over the rear upper end of the elevator 16. Piles may be formed along the field as desired merely by actuating the foot lever or pedal 62.

It is thought that the construction, operation, utility and advantages of the present invention will be clearly understood without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be made without departing from the spirit or scope of the invention as hereinafter claimed or sacrificing any of its advantages.

Having thus described our invention, what we claim as new is:

1. A receptacle structure for a harvesting machine of the class described comprising a frame, a bottom structure in the frame including a shaft with fingers extending rearwardly therefrom and a cover frame extending forwardly therefrom, latch structure for holding the bottom structure normally in place, a shaft, tines extending from the shaft to swing between the fingers, means for rocking the shaft, and means cooperable with the movement of the shaft to cause the unlatching of the latch structure and the tilting of the bottom structure.

2. A receptacle structure for a harvesting machine of the class described comprising a frame, a bottom structure in the frame including a shaft with fingers extending rearwardly therefrom and a cover frame extending forwardly therefrom, latch structure for holding the bottom structure normally in place, a shaft, tines extending from the shaft to swing between the fingers, means for rocking the shaft, and means cooperable with the movement of the shaft to cause the unlatching of the latch structure and the tilting of the bottom structure, means for actuating the shaft comprising a finger extending from the shaft, a segmental gear with a blank portion, a pinion, means for operating the pinion, a rocker swingable to engage the finger to rock the shaft to cause the teeth of the segmental gear to mesh with the pinion.

3. A harvesting machine of the class described comprising a wheeled frame, an elevating mechanism mounted in the frame, a gathering means at the lower end of the mechanism, means for raising and lowering the means and mechanism, drive means comprising a chain and sprocket mechanism from one wheel of the wheeled frame, a second sprocket driven by the chain and sprocket mechanism, a second chain driven by the second sprocket and operatively connected with said elevating mechanism, a third sprocket over which the second chain is trained, and means for raising the third sprocket simultaneously with the gathering means and elevating mechanism, so as to raise the third chain out of mesh with the second sprocket.

4. A harvesting machine of the class described comprising a wheeled frame, an elevating mechanism mounted in the frame, a gathering means at the lower end of the mechanism, means for raising and lowering the means and mechanism, drive means comprising a chain and sprocket mechanism from one wheel of the wheeled frame, a second sprocket driven by the chain and sprocket mechanism, a second chain driven by the second sprocket and operatively connected with said elevating mechanism, a third sprocket over which the second chain is trained, and means for raising the third sprocket simultaneously with the gathering means and elevating mechanism, so as to raise the third chain out of mesh with the second sprocket, and a receptacle mounted at the rear of the wheeled frame to receive material from the upper end of the elevating mechanism.

5. A harvesting machine of the class described comprising a wheeled frame, an elevating mechanism mounted in the frame, a gathering means at the lower end of the mechanism, means for raising and lowering the means and mechanism, drive means comprising a chain and sprocket mechanism from one wheel of the wheeled frame, a second sprocket driven by the chain and sprocket mechanism, a second chain driven by the second sprocket and operatively connected with said elevating mechanism, a third sprocket over which the second chain is trained, and means for raising the third sprocket simultaneously with the gathering means, and elevating mechanism, so as to raise the third chain out of mesh with the second sprocket, and a receptacle mounted at the rear of the wheeled frame to receive material from the upper end of the elevating mechanism, a tiltable bottom in the receptacle including a plurality of fingers, and a shaft with tines extending therefrom, and means for rotating the shaft to swing the tines between the fingers and simultaneously cause the tilting of the bottom.

In testimony whereof we affix our signatures.

HENRY F. KNIEP.
ARMIN LIST.